(12) United States Patent
Wang et al.

(10) Patent No.: US 10,208,793 B2
(45) Date of Patent: Feb. 19, 2019

(54) SLIDE MECHANISM FOR USE IN ELEVATION DEVICE

(71) Applicant: JARLLYTEC CO., LTD., New Taipei (TW)

(72) Inventors: Po-Ming Wang, New Taipei (TW); Chia-Wang Li, New Taipei (TW); Sheng-Hsiang Huang, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 0 days.

(21) Appl. No.: 15/819,021

(22) Filed: Nov. 21, 2017

(65) Prior Publication Data

US 2019/0017545 A1  Jan. 17, 2019

(30) Foreign Application Priority Data

Jul. 12, 2017 (TW) .............................. 106210243 U

(51) Int. Cl.
| | |
|---|---|
| *F16C 29/04* | (2006.01) |
| *F16M 11/24* | (2006.01) |
| *F16C 33/36* | (2006.01) |
| *F16M 13/02* | (2006.01) |

(52) U.S. Cl.
CPC ............ *F16C 29/04* (2013.01); *F16C 33/363* (2013.01); *F16M 11/24* (2013.01); *F16M 13/02* (2013.01); *F16C 2314/00* (2013.01)

(58) Field of Classification Search
CPC .... F16C 29/04; F16C 33/363; F16C 2314/00; F16M 11/24; F16M 13/02; F16M 11/26; F16M 11/28; A47B 9/20; A61G 13/06; E04H 12/18; F16B 7/10; F16B 7/1436
USPC ....... 248/161, 132, 157, 333, 404, 917–920; 108/144.11, 147.19; 403/109.1
See application file for complete search history.

(56) References Cited

U.S. PATENT DOCUMENTS

| 7,374,139 B2* | 5/2008 | Tsai ...................... F16M 11/28 |
| | | 248/157 |
| 2008/0121150 A1* | 5/2008 | Picchio .................... A47B 9/04 |
| | | 108/147.19 |

FOREIGN PATENT DOCUMENTS

TW           M524283        12/2016

* cited by examiner

*Primary Examiner* — Christopher Garft
(74) *Attorney, Agent, or Firm* — Guice Patents PLLC

(57) ABSTRACT

A slide mechanism for use in elevation device comprises: a support seat, longitudinally disposed with at least three wing pieces spaced from each other, wherein at least one lateral surface of each of the wing pieces is respectively and longitudinally pivoted with at least one roller, one of the wing pieces is extended with a neck part having a front end disposed with a connection arm; and a sleeve, having a circumference defined at the top end longitudinally formed with a rail slot, wherein an inner circumference thereof is longitudinally formed with a positioning slot at a location corresponding to the at least one rollers and allowing a guide rail to be disposed and positioned, an outer circumference of each of the rollers is formed with a guide slot sleeved in the guide rail, so that the rollers can be respectively and longitudinally slid along the corresponding guide rail.

17 Claims, 7 Drawing Sheets

A-A

SLIDE MECHANISM FOR USE IN ELEVATION DEVICE

BACKGROUND OF THE INVENTION

1. Field of the Invention

The present invention relates to a slide mechanism, especially to a slide mechanism for use in elevation device.

2. Description of Related Art

A conventional display device, especially a liquid crystal displayer, is commonly seen in our daily work places and domestic environments, for matching with the viewing angle required by a user, an elevation angle adjusting function has been provided, and the installation of an elevation device has also been gradually prevailed, so that the display device is able to meet the requirements of users having different body shapes, and the height adjustment of the display device can also satisfy the requirements of ergonomics.

Generally speaking, a conventional elevation device used in an object to be supported, for example a display device, has a pair of fixed slide rails disposed at two lateral wall frames arranged above a carrier, a pair of wing pieces at the rear end of a support seat is disposed with a pair of moveable slide rails, so that the pair of moveable slide rails are enabled to be longitudinally slid and moved along the pair of fixed slide rails for adjusting the height of the display device. The assembly of the pair of fixed slide rails and the pair of moveable slide rails is defined as a slide rail structure which is well known by the skilled people in the art. As a matter of fact, a plurality of balls are additionally disposed between the fixed slide rail and the moveable slide rail for forming a ball sliding rail structure, so that the moveable slide rail of the ball sliding rail structure is enabled to slide along the fixed slide rail.

After the above-mentioned elevation device being used for a period of time, the moveable slide rail of the ball sliding rail structure at one side or both sides may be dislocated due to the applied forces, so the sliding stroke may be shortened, and noises and an intermission feeling may be generated.

In view of the above-mentioned disadvantages, skilled people in the art have provided many solutions, for example Taiwan Patent NO. M534283 (equivalent to China Patent Application NO. 201620859472.7) has disclosed an elevation device, the elevation device includes a carrier having an upper vertical frame, the left side and the right side of the upper vertical frame are oppositely disposed with a pair of rail slots, one inner wall in each of the rail slots is longitudinally formed with a positioning slot allowing a guide rail to be disposed and positioned; a support seat having a seat plate, the rear end of the seat plate is vertically extended with a pair of wing pieces, backsides of the pair of wing pieces are respectively and longitudinally pivoted with at least one roller, an outer circumference of each of the rollers is formed with a guide slot sleeved in the guide rail, thereby enabling each of the rollers to be longitudinally slid along the guide rail; wherein, because the at least one roller pivoted to each of the wing pieces is restrained in the rail slot and capable of being longitudinally slid along the guide rail, and the guide slot of the roller is sleeved in the guide rail, so that the formation of a gap can be eliminated, noises and an intermission feeling can be lowered.

However, the rollers of the support seat are oppositely arranged, if the support seat is disposed in a tubular carrier having a cross section which is not limited to be in a circular shape, because the limitations formed due to the dimension of the tubular carrier and the affections of difficult processing procedure, the interior of the tubular carrier may not be oppositely disposed with the above-mentioned rail slots used for restraining the rollers, so that a gap may be generated between the rollers and the inner wall of the tubular carrier, and the support seat may get displaced or vibration when it is longitudinally sliding in the tubular carrier; accordingly, the above-mentioned shortages and disadvantages shall be seriously concerned by the skilled people in the art.

SUMMARY OF THE INVENTION

One primary objective of the present invention is to provide a slide mechanism for use in elevation device, at least three wing pieces disposed on a support seat and having at least one roller are spaced with angles, and one of the wing pieces is connected to an object to be supported, so that the at least three wing pieces are able to be sleeved in at least three guide rails correspondingly formed inside a sleeve, and a guide slot of each of the rollers is sleeved in the corresponding guide rail, thereby forming effects of anti-torsion and lowering vibration and having advantages of lowering noises and intermission feelings.

For achieving said objective, one technical solution provided by the present invention is to provide a slide mechanism for use in elevation device, which comprises: a support seat, longitudinally disposed with at least three wing pieces spaced from each other, wherein at least one lateral surface of each of the wing pieces is respectively and longitudinally pivoted with at least one roller, one of the wing pieces is extended with a neck part, and a front end of the neck part is disposed with a connection arm; and a sleeve, having a circumference defined at the top end longitudinally formed with a rail slot allowing the neck part to pass, wherein an inner circumference of the sleeve is longitudinally formed with a positioning slot at a location corresponding to the roller of the wing piece and allowing a guide rail to be disposed and positioned, an outer circumference of the roller is formed with a guide slot sleeved in the guide rail, so that the roller is able to be longitudinally slid along the guide rail.

For achieving said objective, another technical solution provided by the present invention is to provide a slide mechanism for use in elevation device, which comprises: a support seat, longitudinally disposed with at least three wing pieces spaced from each other, wherein at least one lateral surface of each of the wing pieces is respectively and longitudinally pivoted with at least one roller, one of the wing pieces is extended with a neck part, and a front end of the neck part is disposed with a connection arm; and a sleeve, having a circumference defined at the top end longitudinally formed with a rail slot allowing the neck part to pass, wherein an inner circumference of the sleeve is longitudinally and integrally formed with a guide rail at a location corresponding to the roller of the wing piece, an outer circumference of the roller is formed with a guide slot sleeved in guide rail, so that the roller is able to be longitudinally slid along the guide rail.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
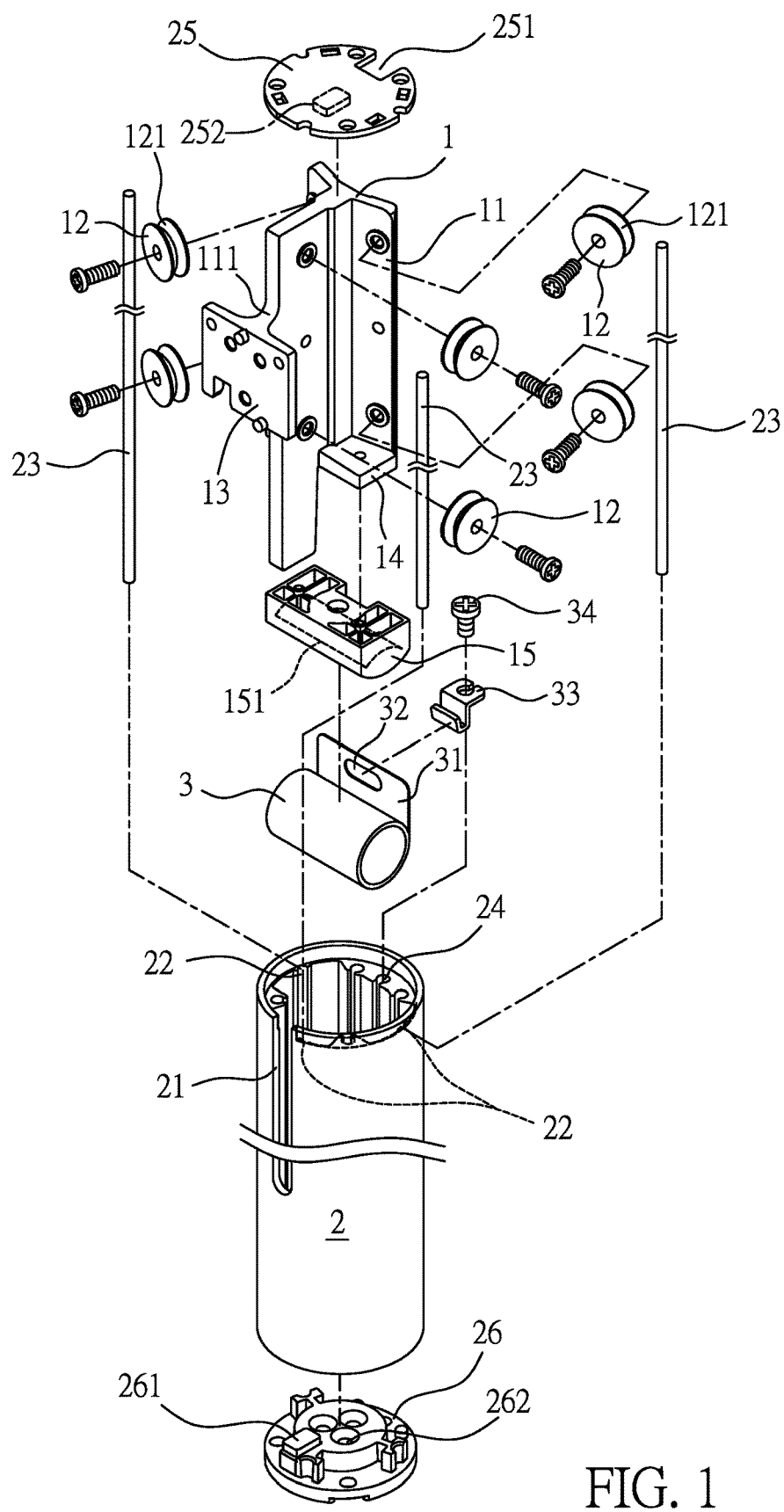
FIG. 1 is a perspective exploded view illustrating a slide mechanism for use in elevation device according to a first embodiment of the present invention.
Figure 2:
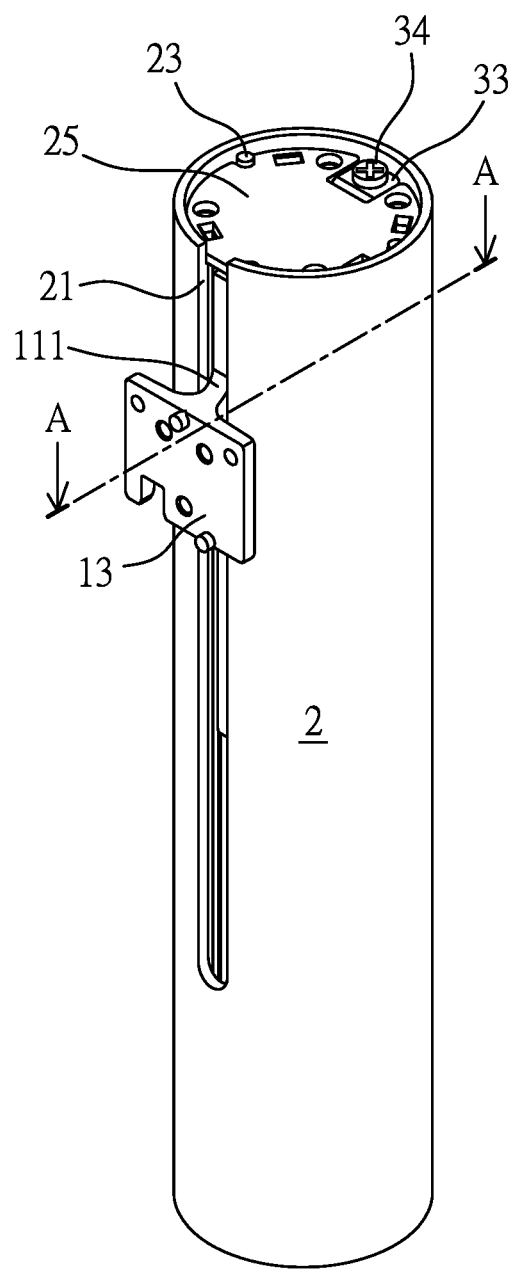
FIG. 2 is a perspective view illustrating the slide mechanism of FIG. 1 after being assembled.
Figure 3:
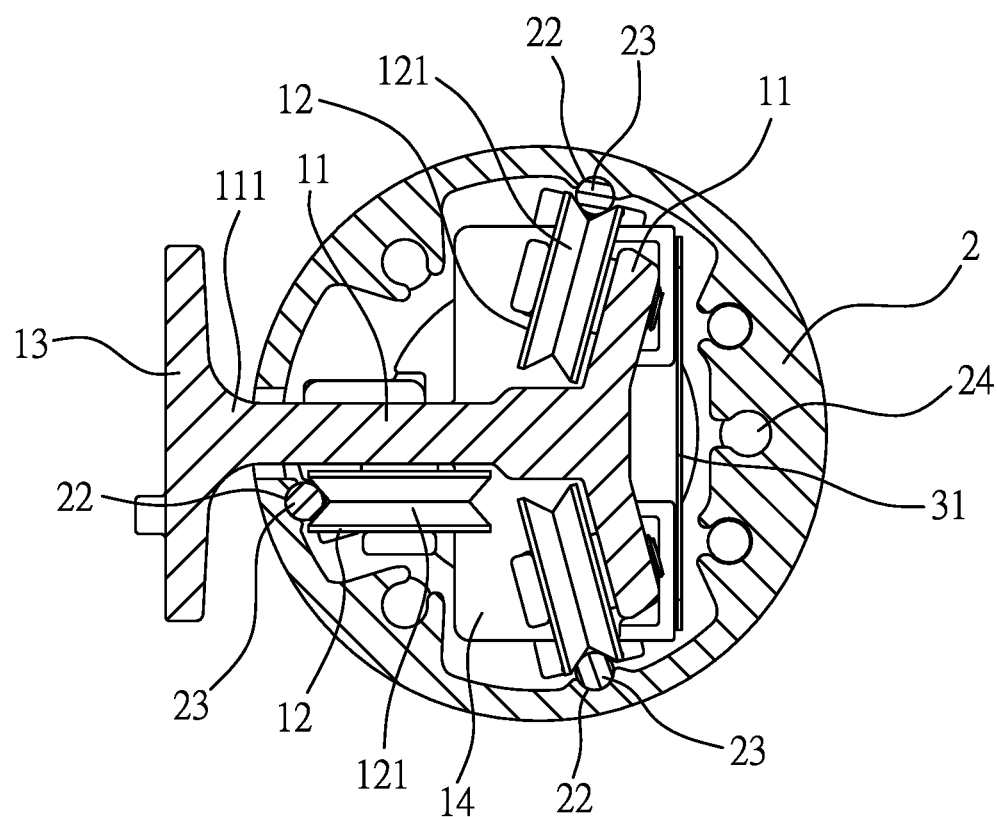
FIG. 3 is a cross sectional view of FIG. 2 taken along an A-A line.

Please refer from FIG. 1 to FIG. 3, the present invention provides a slide mechanism for use in elevation device, which comprises a support seat 1 and a sleeve 2. For allowing the slide mechanism to have functions of being reciprocally slid and being stopped and positioned when a load is provided, the slide mechanism further includes a constant-force spring 3.

The support seat 1 is used for being connected to an object to be supported, for example a flat monitor. The support seat 1 is longitudinally disposed with at least three wing pieces 11 spaced with preset angles; as shown in FIG. 3, the wing pieces 11 are arranged in a Y-like shape, but what shall be addressed is that the scope of the present invention is not limited to the above-mentioned arrangement, the wing pieces 11 can also be arranged in a T-like shape with respect to other applications.

The support seat 1 is disposed in the sleeve 2, and at least one lateral surface of each of the wing pieces 11 is respectively and longitudinally pivoted with at least one roller 12, as shown in FIG. 1, the quantity of the roller 12 disposed on each of the wing pieces 11 is two, and the two rollers 12 are longitudinally arranged as a row; but what shall be addressed is that the scope of the present invention is not limited to the above-mentioned quantity, the quantity of the roller 12 can also be greater than two with respect to other applications.

For preventing a situation of colliding or being inclined due to the existence of a gap, an outer circumference of each of the rollers 12 is respectively formed with a guide slot 121. Wherein, the guide slot 121 is preferably to be formed in a V-like shape for clamping and rollingly contacting a guide rail 23 respectively formed inside the sleeve 2, thus a property of matching the dimensional variation of the guide rail 23 is provided, and the roller 12 is preferably to be formed as a V-shaped bearing in actual applications. The guide slot 121 of each of the rollers 12 and each of the guide rails 23 is in a rolling contact status, so that each of the rollers 12 is able to be longitudinally slid along each of the guide rails 23, thereby forming a stable operating effect.

One of the wing pieces 11 of the support seat 1 is extended with a neck part 111, and the front end of the neck part 111 is transversally disposed with a connection arm 13 for being connected to the object to be supported. Because the at least three wing pieces 11 spaced from each other are respectively matched with the at least one roller 12 which is longitudinally pivoted, the at least three wing pieces 11 are able to be longitudinally moved in a narrower or thinner space formed in a thinned sleeve 2 with the diameter thereof being smaller or the cross section thereof being formed in a non-circular status. For enabling the constant-force spring 3 to be disposed, a spring seat 15 is connected, for example screwed, to a seat plate 14 disposed at the bottom end of the wing pieces 11, a bottom surface of the spring seat 15 is formed with an arc-shaped concave part 151 for allowing the coiled constant-force spring 3 to be disposed, and one free end 31 of the constant-force spring 3 is allowed to pass a slit formed between the wing pieces 11 and an inner wall of the sleeve 2, then to be connected to the top end defined inside the sleeve 2.

The sleeve 2 is served to allow the support seat 1 to be disposed therein, and preferably to be a tubular body formed through an aluminum alloy extrusion procedure, so that a light weight effect can be provided. A circumference defined at the top end of the sleeve 2 is longitudinally formed with a rail slot 21 allowing the neck part 111 to pass, and an inner circumference of the sleeve 2 is longitudinally formed with a positioning slot 22 at the location respectively corresponding to the at least one roller 12 of each of the wing pieces 11 and allowing the guide rail 23 to be disposed. As shown in FIG. 1 and FIG. 3, the guide rail 23 is formed as a round metal rod, and the positioning slot 22 is formed as an arc-shaped concave slot, so that the guide rail 23 can be disposed in the positioning slot 22 without being biased. As such, during the process of the support seat 1 being guided into the sleeve 2 and being longitudinally elevated and slid inside the sleeve 2, the situation of colliding or being inclined due to the existence of the gap can be prevented because the guide slot 121 of the roller 12 is able to clamp and rollingly contact with the guide rail 23 which is respectively and protrudingly formed inside the sleeve 2.

Moreover, for allowing the sleeve 2 to be provided with a locking function, the inner circumference of the sleeve 2 is additionally formed with a plurality of locking slots 24. Please refer to FIG. 1, for fastening the free end 31 of the constant-force spring 3, a buckle hook 33 is disposed in one of the locking slots 24, for example disposed at the top end defined at the rear center, then a connection member 34, for example a screw, is utilized for passing the buckle hook 33 and being locked in the locking slot 24, thus the buckle hook 33 can be fastened at the top end of the inner circumference of the sleeve 2, and a buckle hole 32 formed at the free end 31 is able to be buckled with the buckle hook 33.

Moreover, for preventing the support seat 1 from falling out from the top end of the sleeve 2, the sleeve 2 further includes a top cover 25, and at least one connection member, for example a screw (not shown in figures), is utilized for passing the top cover 25 then being locked in the at least one locking slot 24 which is correspondingly formed in the inner circumference, so that the top cover 25 can be served to cover and seal an opening formed at the top end of the sleeve 2. Wherein, the top cover 25 is formed with a notch 251 at a location corresponding to the buckle hook 33 for allowing the buckle hook 33 to be received. Furthermore, the bottom surface of the top cover 25 is disposed with a top buffering pad 252 corresponding to the location of the support seat 1, the top buffering pad 252 is able to provide a buffering effect when the support seat 1 is in contact with the top buffering pad 252, and a sound generated during the impact can be absorbed.

The sleeve 2 further includes a bottom cover 26, and at least one connection member, for example a screw (not shown in figures), is utilized for passing the bottom cover 26 then being locked in the at least one locking slot 24 which is correspondingly formed in the inner circumference, so that the bottom cover 26 can be served to cover and seal an opening formed at the bottom end of the sleeve 2. Wherein, the top surface of the bottom cover 26 is disposed with a bottom buffering pad 261 corresponding to the location of the support seat 1, the bottom buffering pad 261 is able to provide a buffering effect when the support seat 1 is in contact with the bottom buffering pad 261, and a sound generated during the impact can be absorbed. Moreover, the bottom cover 26 is longitudinally formed with at least one connection hole 262, a connection member, for example a screw (not shown in figures), is utilized for passing each of the connection holes 262 then being locked on a vertical post 4 shown in FIG. 6, so that the sleeve 2 is provided with a longitudinal connecting function.

Based on the illustrations of the support seat 1, the sleeve 2 and the constant-force spring 3, the perspective status of the assembled slide mechanism is as shown in FIG. 2; in addition, as shown in FIG. 3, it is obvious that a three contact points status is stably established between each of the rollers 12 of the wing pieces 11 and each of the guide rails 23, so that unexpected effects of anti-torsion and lowering vibration can be obtained.

Figure 4:
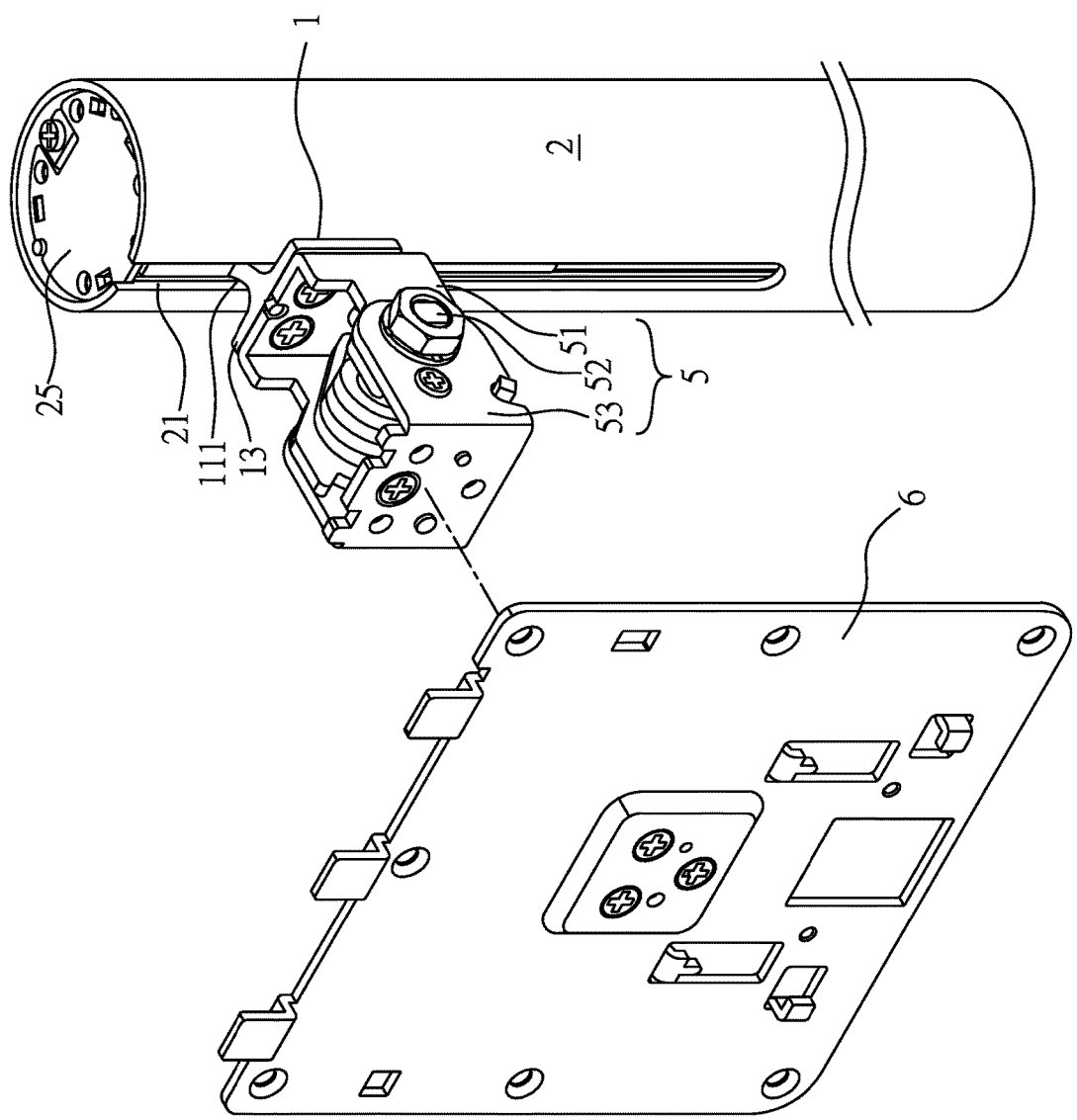
FIG. 4 is a perspective exploded view illustrating the slide mechanism being connected to an adjustment member and an installation member of an object to be supported.
Figure 5:
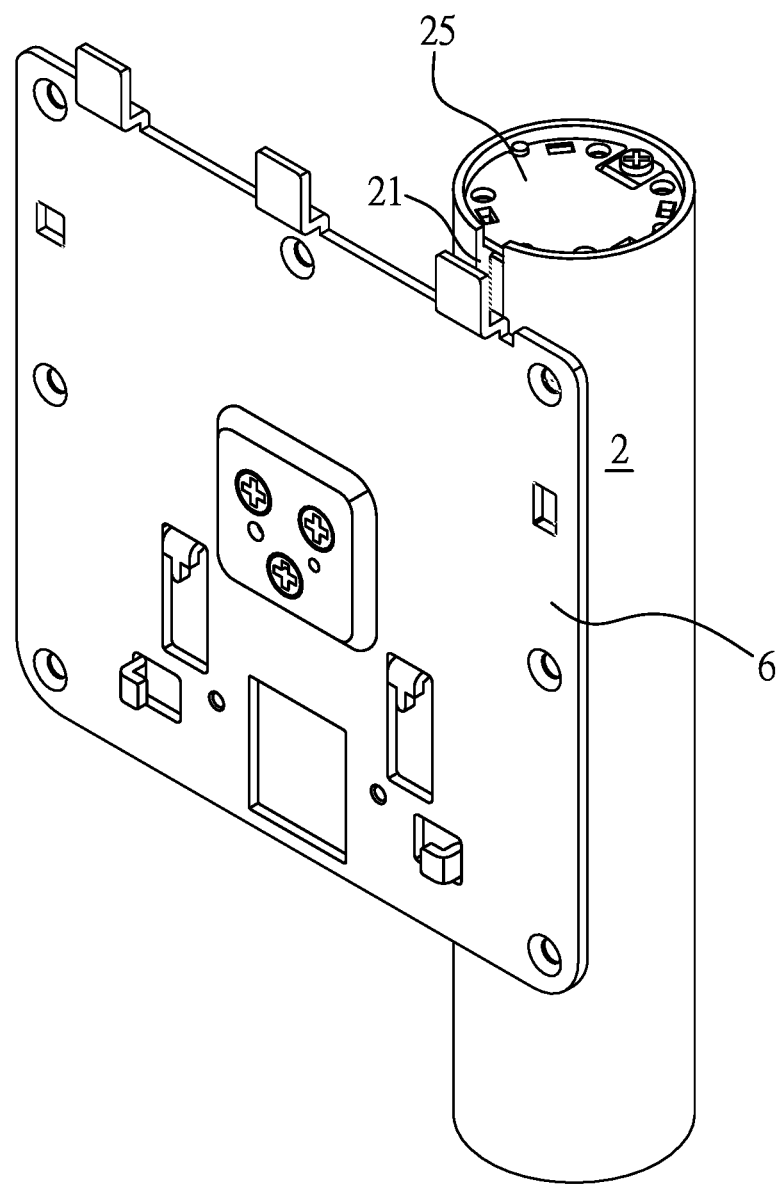
FIG. 5 is a perspective view illustrating the assembly of the slide mechanism, the adjustment member and the installation member of the object to be supported.
Figure 6:
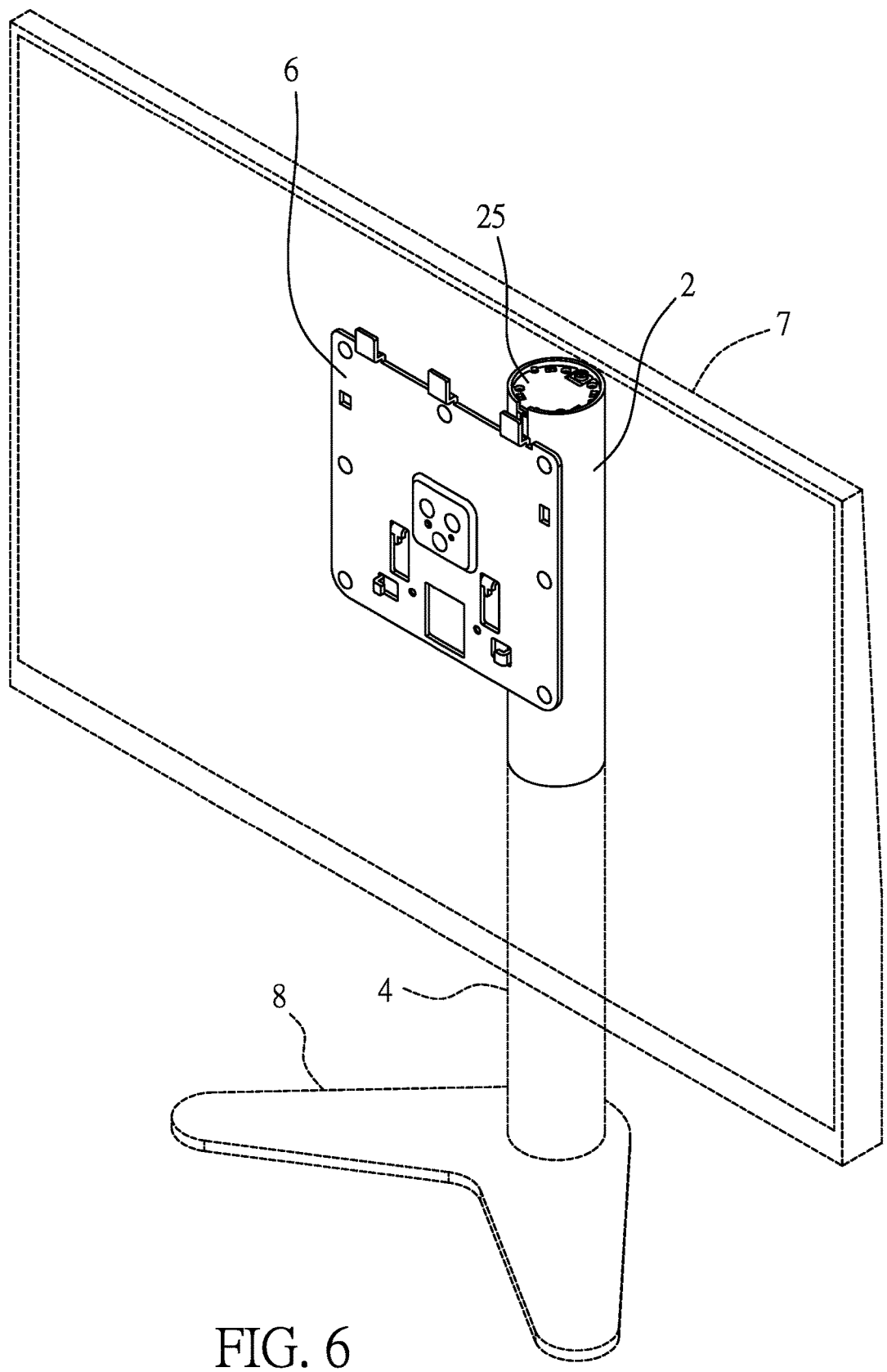
FIG. 6 is a perspective view illustrating the assembly of the slide mechanism, the object to be supported and a base.

Please refer from FIG. 4 to FIG. 6, which illustrate an application of the slide mechanism being served to provide an elevating function, the neck part 111 of the support seat 1 is disposed in the rail slot 21 at the front end of the sleeve 2, and the connection arm 13 at the front end of the neck part 111 is disposed with a conventional adjustment member 5, the adjustment member 5 includes a fasten member 51 connected to the connection arm 13, and a swing member 53 pivoted through a conventional rotation shaft structure 52, so that the swing member 53 is able to be upwardly/downwardly swung relative to the support seat 1 for adjusting the inclined angle.

An installation member 6 complying with the standard issued by the Video Electronics Standards Association (VESA) is disposed at the front end of the adjustment member 5, so that an object to be supported 7, for example a flat monitor (as show in FIG. 6), can be installed at the front end of the installation member 6. The sleeve 2 can be directly disposed on a base 8; or the bottom end of the sleeve 2 is connected to the vertical post 4, then the bottom end of the vertical post 4 is disposed on the base 8.

The constant-force spring 3 is a conventional art, and disposed in the arc-shaped concave part 151 of the spring seat 15, the free end 31 of the constant-force spring 3 is upwardly extended and fastened on the buckle hook 33. An elastic force provided by the constant-force spring 3 is sufficient enough for supporting the natural weight of the support seat 1 and the object to be supported 7, so that the object to be supported 7 and the support seat 1 can be synchronously and longitudinally elevated or stopped and positioned at the front end of the sleeve 2.

Based on the descriptions for each component of the present invention and the assembling relation thereof, the assembly is as shown in FIG. 6. Wherein, with the at least one roller 12 disposed on the wing pieces 11, the support seat 1 is able to be longitudinally slid along the guide rail 23 correspondingly formed inside the sleeve 2, and the constant-force spring 3 is connected to the support seat 1 and the sleeve 2, the constant-force spring 3 is able to constantly provide an upward action force to the support seat 1 for balancing the downward gravity force of the object to be supported 7, for example the flat monitor, thereby enabling the support seat 1 to be stably and smoothly and longitudinally elevated at the front end of the sleeve 2.

Please refer to FIG. 3, it is obvious that each of the rollers 12 is abutted against the guide rail 23 correspondingly formed inside the sleeve 2; in other words, the at least one roller 12 of the at least three wing pieces 11 of the support seat 1 is abutted against the corresponding guide rails 23 inside the sleeve 2 with at least three contact points, thus during the sliding process, the guide slot 121 of each of the rollers 12 is continuously in contact with a corresponding guide rail 23, thereby allowing a longitudinal elevation adjustment to be stably processed.

Figure 7:
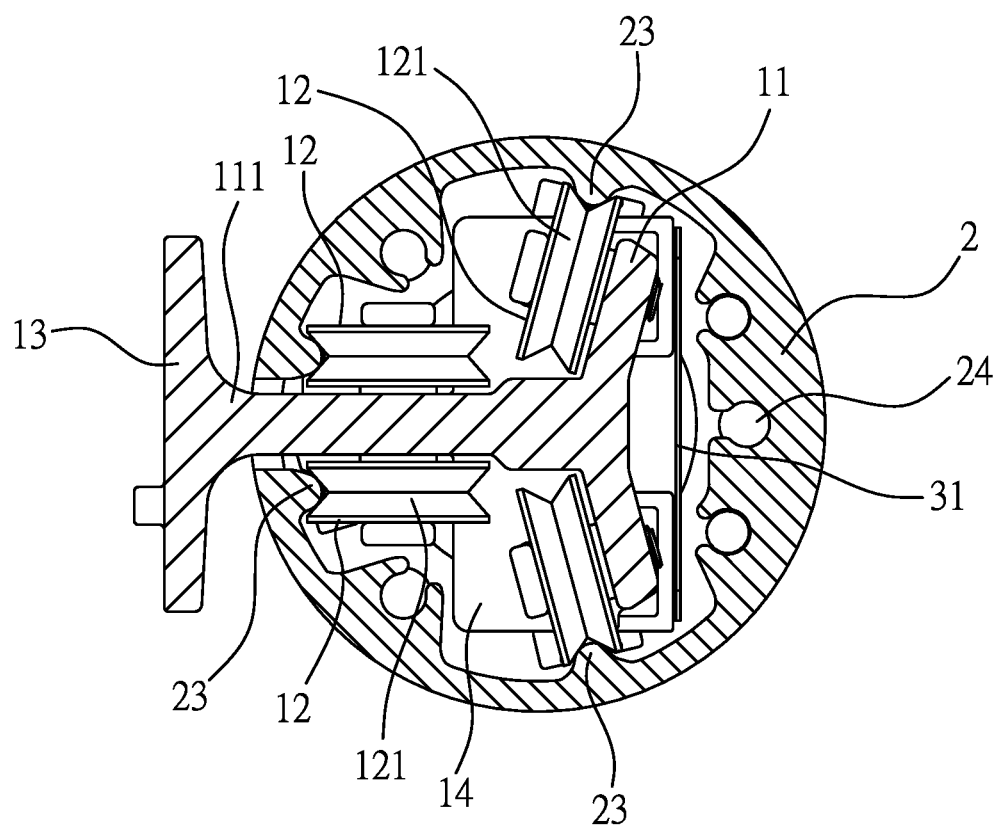
FIG. 7 is a cross sectional view illustrating the slide mechanism according to a second embodiment of the present invention.

Please refer to FIG. 7, which discloses a second embodiment of the support seat; comparing the second embodiment and the first embodiment, the same codes used in the second embodiment and the first embodiment are defined as the same components, because a lot of the components are shared in the second embodiment and the first embodiment, only different components will be illustrated hereinafter.

According to the second embodiment, the guide rail 23 is longitudinally and integrally protruded from the inner circumference of the sleeve 2, thus the positioning slot 22 disclosed in the first embodiment and used for allowing the guide rail 23 to be disposed and positioned is not required, thereby providing effects of saving the components and simplifying the assembling procedure.

Moreover, the at least one roller 2 is disposed at two sides of each of the wing pieces 11 with a coaxial or a staggering means, thus the quantity of the roller 12 can be increased, the load can be further shared, and a smooth longitudinal elevating operation can be achieved.

Based on what has been disclosed above, advantages achieved by the present invention are as followings: with the design of the at least three wing pieces being disposed with the at least one roller, the wing pieces can be smoothly and longitudinally elevated inside the sleeve, thus the service life can be prolonged, and noises can be effectively reduced, accordingly, the present invention can be adopted for replacing the conventional slide rail structure, and the production cost can be greatly lowered due to the design of using less components; moreover, at least three of the wing pieces are adopted, thus the sleeve used for allowing the support seat to be disposed can be designed to be thinner and lighter, accordingly, the present invention is novel and more practical in use comparing to prior arts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A slide mechanism for use in elevation device, comprising:
   a support seat, longitudinally disposed with at least three wing pieces spaced from each other, wherein at least one roller is pivotally connected to at least one lateral surface of each of said wing pieces respectively, one of said wing pieces is extended with a neck part, and a front end of said neck part is disposed with a connection arm;

a sleeve, having a circumference defined at a top end longitudinally formed with a rail slot allowing said neck part to pass, wherein an inner circumference of said sleeve is longitudinally formed with a positioning slot at a location corresponding to said roller of said wing piece and allowing a guide rail to be disposed and positioned, an outer circumference of said roller is formed with a guide slot, said guide rail is confined in said guide slot, wherein said roller is able to be longitudinally slid along said guide rail; and a constant-force spring, said constant-force spring has a coiled shape and is connected between said support seat and said sleeve; said support seat further includes a spring seat, said spring seat is connected to a seat plate disposed at a bottom end of said support seat, a bottom surface of said spring seat is formed with an arc-shaped concave part for allowing said constant-force spring to be disposed, and one free end of said constant-force spring is connected to the top end of said inner circumference of said sleeve;

wherein said inner circumference is formed with a plurality of locking slots; a buckle hook is disposed above one of said locking slots, and a connection member is utilized for passing said buckle hook and being locked in said locking slot, thus said buckle hook is fastened at the top end of said inner circumference, and a buckle hole formed at said free end is buckled with said buckle hook.

2. A slide mechanism for use in elevation device, comprising:

a support seat, longitudinally disposed with at least three wing pieces spaced from each other, wherein at least one roller is pivotally connected to at least one lateral surface of each of said wing pieces respectively, one of said wing pieces is extended with a neck part, and a front end of said neck part is disposed with a connection arm;

a sleeve, having a circumference defined at a top end longitudinally formed with a rail slot allowing said neck part to pass, wherein an inner circumference of said sleeve is longitudinally and integrally formed with a guide rail at a location corresponding to said roller of said wing piece, an outer circumference of said roller is formed with a guide slot, said guide rail is confined in said guide slot, wherein said roller is able to be longitudinally slid along said guide rail; and a constant-force spring, said constant-force spring has a coiled shape and is connected between said support seat and said sleeve; said support seat further includes a spring seat, said spring seat is connected to a seat plate disposed at a bottom end of said support seat, a bottom surface of said spring seat is formed with an arc-shaped concave part for allowing said constant-force spring to be disposed, and one free end of said constant-force spring is connected to the top end of said inner circumference of said sleeve;

wherein said inner circumference is formed with a plurality of locking slots; a buckle hook is disposed above one of said locking slots, and a connection member is utilized for passing said buckle hook and being locked in said locking slot, thus said buckle hook is fastened at the top end of said inner circumference, and a buckle hole formed at said free end is buckled with said buckle hook.

3. The slide mechanism for use in elevation device as claimed in claim 1, wherein said roller is formed as a V-shaped bearing for clamping and rollingly contacting said guide rail.

4. The slide mechanism for use in elevation device as claimed in claim 2, wherein said roller is formed as a V-shaped bearing for clamping and rollingly contacting said guide rail.

5. The slide mechanism for use in elevation device as claimed in claim 1, wherein said guide slot of said roller is formed in a V shape for clamping and rollingly contacting said guide rail.

6. The slide mechanism for use in elevation device as claimed in claim 2, wherein said guide slot of said roller is formed in a V shape for clamping and rollingly contacting said guide rail.

7. The slide mechanism for use in elevation device as claimed in claim 1, wherein said positioning slot is formed as an arc-shaped concave slot, and said guide rail is formed as a round metal rod.

8. The slide mechanism for use in elevation device as claimed in claim 1, wherein said wing pieces are arranged in a Y shape or a T shape.

9. The slide mechanism for use in elevation device as claimed in claim 2, wherein said wing pieces are arranged in a Y shape or a T shape.

10. The slide mechanism for use in elevation device as claimed in claim 1, wherein said inner circumference of said sleeve is formed with a plurality of locking slots; said sleeve further includes a top cover, at least one connection member is utilized for passing said top cover and being locked in said locking slot correspondingly formed in said inner circumference, so that said top cover is able to be served to cover and seal an opening formed at the top end of said sleeve.

11. The slide mechanism for use in elevation device as claimed in claim 2, wherein said inner circumference of said sleeve is formed with a plurality of locking slots; said sleeve further includes a top cover, at least one connection member is utilized for passing said top cover and being locked in said locking slot correspondingly formed in said inner circumference, so that said top cover is able to be served to cover and seal an opening formed at the top end of said sleeve.

12. The slide mechanism for use in elevation device as claimed in claim 10, wherein a bottom surface of said top cover is disposed with a top buffering pad corresponding to a location of said support seat.

13. The slide mechanism for use in elevation device as claimed in claim 11, wherein a bottom surface of said top cover is disposed with a top buffering pad corresponding to a location of said support seat.

14. The slide mechanism for use in elevation device as claimed in claim 1, wherein said inner circumference is formed with a plurality of locking slots; said sleeve further includes a bottom cover, at least one connection member is utilized for passing said bottom cover and being locked in said locking slot correspondingly formed in said inner circumference, so that said bottom cover is able to be served to cover and seal an opening formed at the bottom end of said sleeve.

15. The slide mechanism for use in elevation device as claimed in claim 2, wherein said inner circumference is formed with a plurality of locking slots; said sleeve further includes a bottom cover, at least one connection member is utilized for passing said bottom cover and being locked in said locking slot correspondingly formed in said inner circumference, so that said bottom cover is able to be served to cover and seal an opening formed at the bottom end of said sleeve.

16. The slide mechanism for use in elevation device as claimed in claim 14, wherein a top surface of said bottom cover is disposed with a bottom buffering pad corresponding to a location of said support seat.

17. The slide mechanism for use in elevation device as claimed in claim 15, wherein a top surface of said bottom cover is disposed with a bottom buffering pad corresponding to a location of said support seat.

* * * * *